(12) United States Patent
Adam et al.

(10) Patent No.: US 12,177,360 B2
(45) Date of Patent: Dec. 24, 2024

(54) SYSTEMS AND METHODS FOR VERIFYING VIDEO AUTHENTICITY USING BLOCKCHAIN

(71) Applicant: Tyco Fire & Security GmbH, Neuhausen am Rheinfall (CH)

(72) Inventors: Lipphei Adam, Nolensville, TN (US); George Martinez, Boca Raton, FL (US); Jason Ouellette, Westford, MA (US); Brian Richard, Westford, MA (US)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 416 days.

(21) Appl. No.: 17/393,182

(22) Filed: Aug. 3, 2021

(65) Prior Publication Data

US 2023/0038652 A1 Feb. 9, 2023

(51) Int. Cl.
*H04L 9/32* (2006.01)
*G06F 21/10* (2013.01)
*H04L 9/00* (2022.01)

(52) U.S. Cl.
CPC ............ *H04L 9/3247* (2013.01); *G06F 21/10* (2013.01); *H04L 9/3239* (2013.01); *H04L 9/50* (2022.05)

(58) Field of Classification Search
CPC ....... H04L 9/3239; H04L 9/3247; H04L 9/50; G06F 21/10; G06F 21/64
USPC .......................................................... 713/176
See application file for complete search history.

(56) References Cited

U.S. PATENT DOCUMENTS

| | | |
|---|---|---|
| 2020/0159891 A1 | 5/2020 | Patel et al. |
| 2020/0336907 A1 | 10/2020 | Jain |
| 2023/0224174 A1* | 7/2023 | Pagani ..................... G06F 21/62 713/165 |

OTHER PUBLICATIONS

What's the difference between a private and public blockchain? https://intheblack.cpaaustralia.com.au/technology/difference-between-private-public-blockchain Nicola Heath Sep. 5, 2018 (Year: 2018).*

(Continued)

*Primary Examiner* — Benjamin A Kaplan
(74) *Attorney, Agent, or Firm* — ArentFox Schiff LLP (57) ABSTRACT

Disclosed herein are apparatuses and methods for verifying video authenticity using blockchain. An implementation may include receiving a video clip from a first source and generating a genesis block of a blockchain, wherein the genesis block includes the video clip, metadata of the video clip, and a first hash value of both the video clip and the metadata. The implementation includes distributing the blockchain to a plurality of nodes in a blockchain network. The implementation includes for each indication received of activity performed on the video clip to be recorded on the blockchain, verifying the activity and generating a new block on the blockchain recording the activity. The implementation includes receiving a modified version of the video clip, verifying an authenticity of the modified version based on each activity recorded in the blockchain, and in response to determining that the modified version is not authentic, generating an alert indicating inauthenticity.

18 Claims, 6 Drawing Sheets

(56) References Cited

OTHER PUBLICATIONS

International Search Report and Written Opinion in PCT/US2022/073355, mailed Oct. 5, 2022, 18 pages.
Lusetti et al., "A blockchain based solution for the custody of digital files in forensic medicine," Forensic Science International: Digital Investigation, 2020, vol. 35, No. 301017, 11 pages.

\* cited by examiner

SYSTEMS AND METHODS FOR VERIFYING VIDEO AUTHENTICITY USING BLOCKCHAIN

TECHNICAL FIELD

The described aspects relate to video authentication systems.

BACKGROUND

Aspects of the present disclosure relate generally to video authentication and security systems, and more particularly, to verifying video authenticity and chain of custody/ownership using blockchain.

Current methods for generating video evidence for forensics investigations often rely on an encryption and/or hashing algorithm to prevent tampering or to prove authenticity. However, existing methods do not safeguard against re-creation or duplication of the video evidence—therefore making it possible for an alternate video to be fabricated using the same encryption and/or hashing algorithm without any way of detecting the original source/ownership.

Conventional video authentication systems are unable to address these issues. Accordingly, there exists a need for improvements in such systems.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

An example implementation includes a method for verifying video authenticity using blockchain, comprising receiving a video clip from a first source. The method further includes generating a genesis block of a blockchain, wherein the genesis block includes the video clip, metadata of the video clip, and a first hash value of both the video clip and the metadata. The method further includes distributing the blockchain to a plurality of nodes in a blockchain network. The method further includes for each indication received of activity performed on the video clip to be recorded on the blockchain, verifying the activity and generating a new block on the blockchain recording the activity. The method further includes receiving a modified version of the video clip, verifying an authenticity of the modified version based on each activity recorded in the blockchain, and in response to determining that the modified version is not authentic, generating an alert indicating inauthenticity.

Another example implementation includes an apparatus for verifying video authenticity using blockchain, comprising a memory and a processor communicatively coupled with the memory. The processor is configured to receive a video clip from a first source. The processor is configured to generate a genesis block of a blockchain, wherein the genesis block includes the video clip, metadata of the video clip, and a first hash value of both the video clip and the metadata. The processor is configured to distribute the blockchain to a plurality of nodes in a blockchain network. For each indication received of activity performed on the video clip to be recorded on the blockchain, the processor is configured to verify the activity and generate a new block on the blockchain recording the activity. The processor is configured to receive a modified version of the video clip. The processor is configured to verify an authenticity of the modified version based on each activity recorded in the blockchain, and in response to determining that the modified version is not authentic, generate an alert indicating inauthenticity.

Another example implementation includes an apparatus for verifying video authenticity using blockchain, comprising means for receiving a video clip from a first source. The apparatus further includes means for generating a genesis block of a blockchain, wherein the genesis block includes the video clip, metadata of the video clip, and a first hash value of both the video clip and the metadata. The apparatus further includes means for distributing the blockchain to a plurality of nodes in a blockchain network. For each indication received of activity performed on the video clip to be recorded on the blockchain, the apparatus further includes means for verifying the activity and generating a new block on the blockchain recording the activity. The apparatus further includes means for receiving a modified version of the video clip. The apparatus further includes means for verifying an authenticity of the modified version based on each activity recorded in the blockchain, and in response to determining that the modified version is not authentic, generating an alert indicating inauthenticity.

Another example implementation includes a computer-readable medium for verifying video authenticity using blockchain, executable by a processor to receive a video clip from a first source. The instructions are further executable to generate a genesis block of a blockchain, wherein the genesis block includes the video clip, metadata of the video clip, and a first hash value of both the video clip and the metadata. The instructions are further executable to distribute the blockchain to a plurality of nodes in a blockchain network. For each indication received of activity performed on the video clip to be recorded on the blockchain, the instructions are further executable to verify the activity and generate a new block on the blockchain recording the activity. The instructions are further executable to receive a modified version of the video clip. The instructions are further executable to verify an authenticity of the modified version based on each activity recorded in the blockchain, and in response to determining that the modified version is not authentic, generate an alert indicating inauthenticity.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The present disclosure includes apparatuses and methods that provide verification of video authenticity using blockchain technology. The present disclosure leverages blockchain immutable transactions ledger to prove ownership and authenticity of any video evidence generated for the purpose of digital forensics investigation. Additionally, the transactions ledger provides irrefutable chain-of-custody of the video content from the time of creation to the time the video content is reviewed and used as evidence in a forensics case. Moreover, in some implementations, the described apparatus and methods may selectively operate to verify video authenticity, which improves efficiency by reducing use of processing and memory resources.

Figure 1:
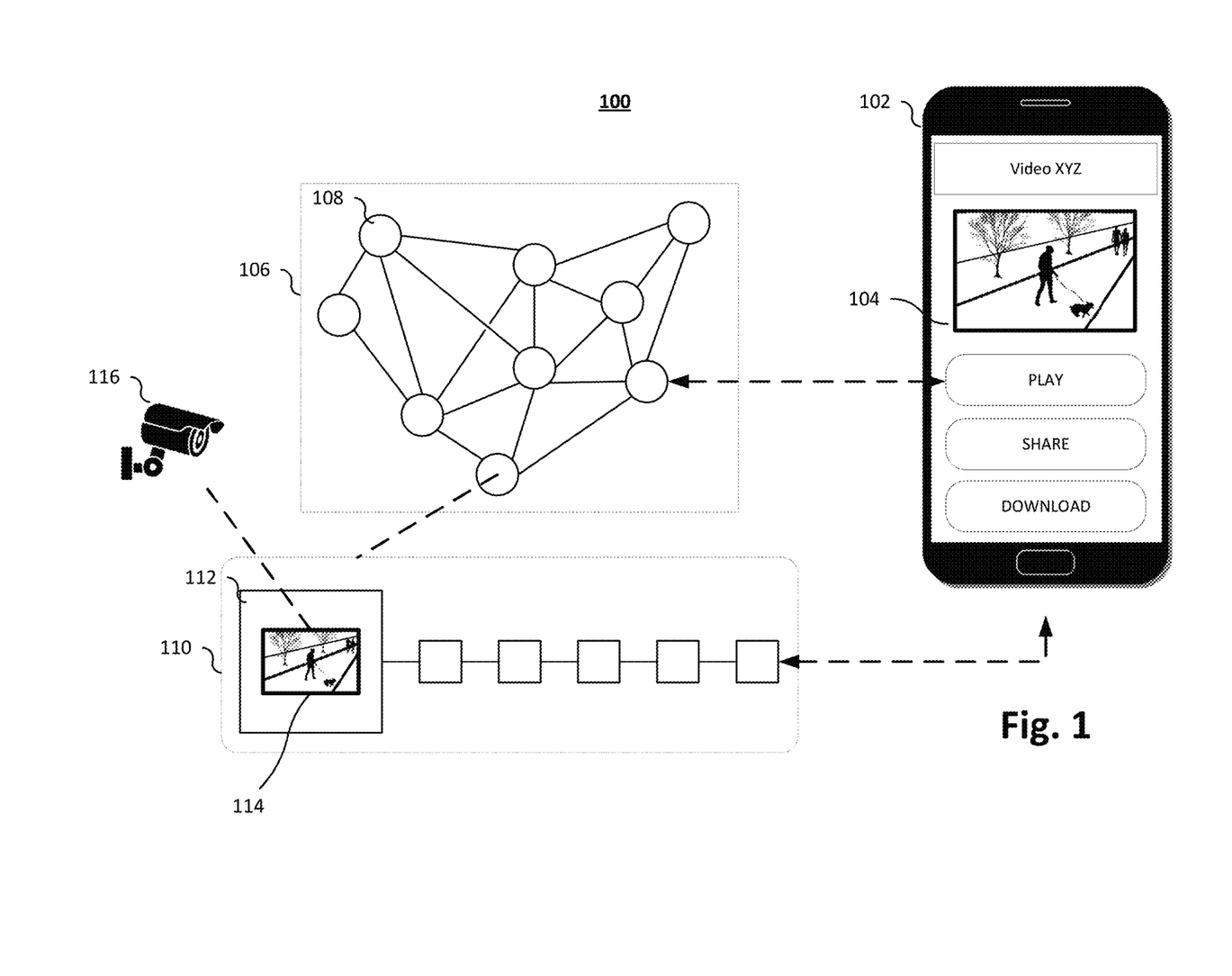
FIG. 1 is a diagram of a blockchain system used to verify video authenticity, in accordance with exemplary aspects of the present disclosure.

FIG. 1 is a diagram of blockchain system 100 used to selectively verify video authenticity, in accordance with exemplary aspects of the present disclosure. System 100 includes blockchain network 106, which may comprise a plurality of nodes 108. In some aspects, each node 108 is a computing device (e.g., a computer, laptop, smartphone, server, etc.) that has access to blockchain 110. In some aspects, blockchain network 106 is a private network comprising nodes 108 that are added into network 106 by invitation. For example, blockchain network 106 may solely include nodes 108, which are computers of an investigative department. In some aspects, blockchain network 106 is a public network in which nodes 108 can join without restrictions (other than minimum hardware/software requirements for managing blockchain 110). For example, once a computer has involved the necessary dependencies to run the blockchain platform and has downloaded the latest blockchain 110, the computer may join network 106 as a node 108. In some aspects, blockchain 110 and blockchain network 106 is provided by a blockchain-as-a-service (BaaS).

Consider an example in which a security camera 116 captures video surveillance of a public park. A crime occurs and is captured by security camera 116. During the police investigation, video clip 114 associated with the crime is requested. For example, security camera 116 may generate a plurality of video clips and video clip 114 is selected from the plurality of video clips. Suppose that blockchain network 106 is a private network including nodes 108, which are computers belonging to police investigators and other staff members in the police department. The owner of video clip 114 may be sent a request to join as a node of blockchain network 106. In response to receiving the request, the owner may install a video authentication component (described in FIG. 3) on device 102 (e.g., the owner's smartphone), which may be a blockchain client application that allows nodes 108 to access blockchain 110, verify records 112 on blockchain 110, upload new records, download blockchain 110, share blockchain 110, share video clip 114, etc. The owner of security camera 116 may upload video clip 114 to the video authentication component via a user interface 104 of the video authentication component on device 102. The video authentication component generates a genesis block that includes video clip 114, its associated metadata, and a hash value. It should be noted that this process is selective. For example, not all video clips captured by security camera 116 are stored on the blockchain—only the video clip(s) that are selected for access. This reduces the amount of processing and memory usage for each video stream generated by security camera 116 because only the relevant video clip(s) are stored on the blockchain (e.g., video clip(s) depicting an activity of interest such as a crime).

As discussed previously, videos are prone to being changed over the course of time. For example, an unprotected video of a crime may be tampered with (e.g., modified to hide evidence) before a court case. Once tampered with, it is difficult to evaluate the authenticity of the videos. For example, a judge or jury may incorrectly find the tampered video to be authentic. By placing video clip 114 on blockchain 110, users may monitor who accessed the video, whether it was downloaded, shared, modified, etc., and whether any attempts to access, modify, download, etc., were associated with malicious intent. For example, if a person attempts to download video clip 114 and alter the video using a neural network (e.g., using deep fake technology), the modified video would be rejected by nodes 108 during the verification process because of a failure to achieve consensus (i.e., a majority of nodes 108 fail to agree on the validity of the modified video).

Figure 2:
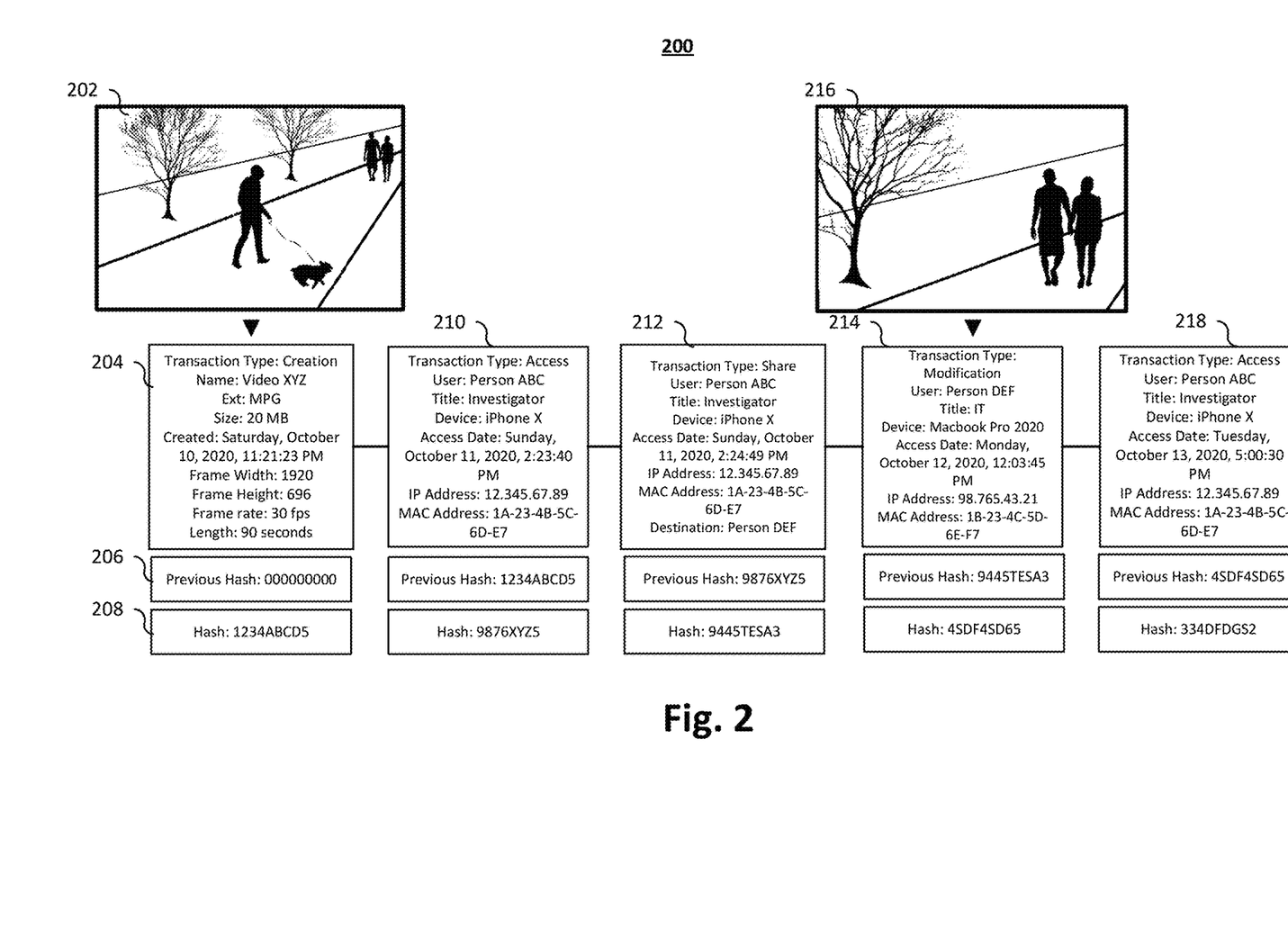
FIG. 2 is a diagram of a blockchain ledger used to verify video authenticity, in accordance with exemplary aspects of the present disclosure.

FIG. 2 is a diagram of blockchain ledger 200 (used interchangeably with distributed ledger 200 and blockchain 200) used to verify video authenticity, in accordance with exemplary aspects of the present disclosure. Blockchain 200 represents a chain of custody indicative of who "touched" video clip 202, when, and how.

Each block in blockchain 200 is made up of a payload segment (e.g., 204, 210, 212, 214, 218), previous hash 206, and current hash 208. In some aspects, the initial hash value of video clip 202 is calculated by security camera 116 (or the device used to capture video clip 202). This is because the video clip may be tampered with before the video clip 202 is uploaded by the video authentication component. On-site hashing and uploading improves security by preventing modifications to the original video. In other aspects, the video authentication component computes the hash value in response to receiving video clip 202.

As shown in FIG. 2, the genesis block of blockchain 200 includes video clip 202 and video clip metadata such as, but not limited to, the name, extension, size, creation time, frame information, length, physical location identifier, source camera identifier, etc. It should be noted that the block may also include information about security camera 116 (e.g., model, IP address, MAC address, owner, camera identifier, physical location identifier, etc.).

Each block in FIG. 2 includes information about a transaction that took place in associated with video clip 202. For example, the transaction type indicated in payload segment 204 is "creation," which indicates that the video was created. The transaction type of payload segments 210 and 218 indicate "access." The transaction type of payload segment 212 is "share." The transaction type of payload segment 214 is "modification." Other examples of transaction types include, but are not limited to, "download" and "new node." In FIG. 2, video clip 202 is created and uploaded to blockchain 200. Person ABC, an investigator of the police department, then accesses the video via a video authentication component of one of nodes 108. Person ABC may then share the video clip 202 with Person DEF in the IT sector of the police department. For example, person ABC may wish to zoom in on one portion of the video. Person DEF then modifies the video and adds modified video clip 216 to blockchain 200. Person ABC then accesses the modified video clip 216.

When modified video clip 216 is added to blockchain 200, the remaining nodes 108 of blockchain network 106 verify the modification. A consensus algorithm (such as but not limited to byzantine fault tolerance (BFT)) is then utilized to determine whether to add modified video clip 216 in blockchain 200. In some aspects, the verification process involves evaluating the changes made to the original video clip 202. For example, each node may determine a differential between modified video clip 216 and original video clip 202. The differential is a data structure that indicates a plurality of differences between each frame of the respective video clips. Each node of nodes 108 may then determine whether each difference is an authorized difference. For example, nodes 108 may refer to a database that includes plurality of authorized change types. Such changes may include but are not limited to cropping, zooming, downsampling, upsampling, applying a filter, etc. Suppose that a person attempts to upload a video clip in which a face swap is performed. Such a change is not included in the plurality of authorized change types and accordingly a node will reject the change. Other factors that a node takes into consideration when verifying a video is the source of the change (e.g., Person DEF may be a trusted entity).

Figure 3:
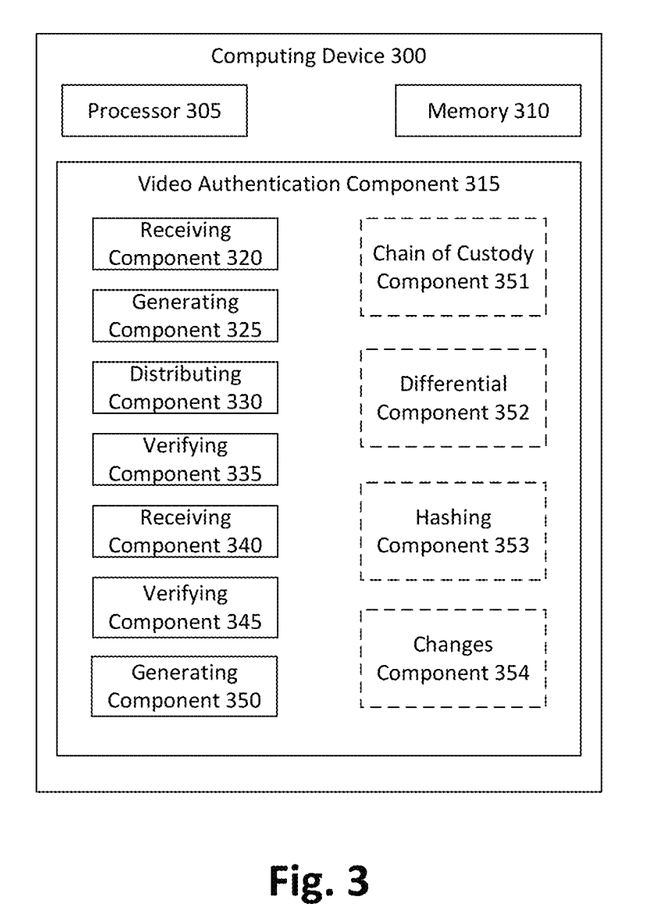
FIG. 3 is a block diagram of a computing device executing a video authentication component, in accordance with exemplary aspects of the present disclosure.
Figure 4:
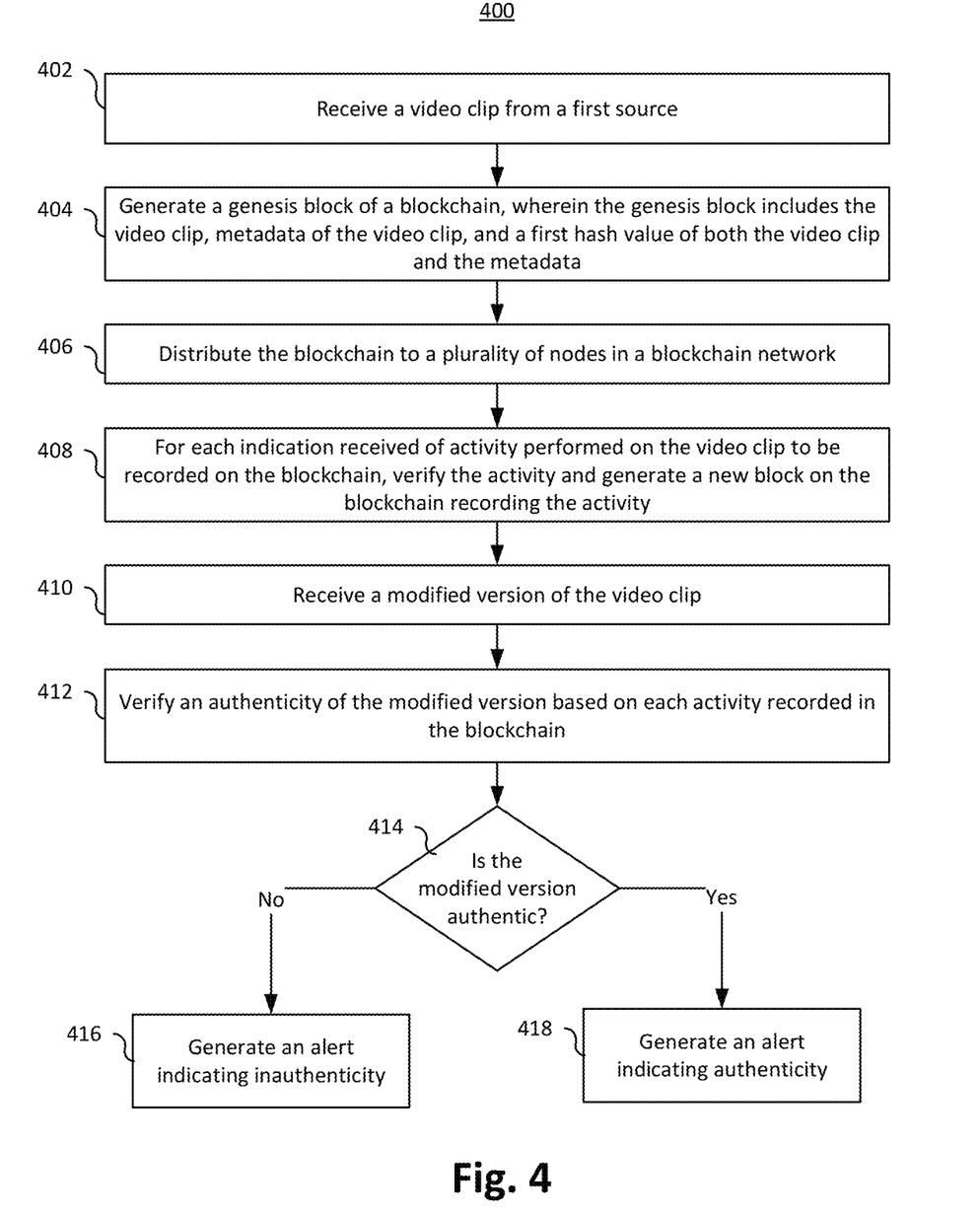
FIG. 4 is a flowchart illustrating a method of verifying video authenticity using blockchain, in accordance with exemplary aspects of the present disclosure.

FIG. 3 is a block diagram of computing device 300 executing a video authentication component 315, in accordance with exemplary aspects of the present disclosure. FIG. 4 is a flowchart illustrating method 400 of verifying video authenticity using blockchain, in accordance with exemplary aspects of the present disclosure. Referring to FIG. 3 and FIG. 4, in operation, computing device 300 may perform method 400 of verifying video authenticity using blockchain via execution of video authentication component 315 by processor 305 and/or memory 310.

At block 402, the method 400 includes receiving a video clip from a first source. For example, in an aspect, computer device 300, processor 305, memory 310, video authentication component 315, and/or receiving component 320 may be configured to or may comprise means for receiving video clip 202 from a first source (e.g., an owner of security camera 116). In some aspects, the receiving is selective. For example, receiving component 320 may receive a plurality of video clips including video clip 202 from the first source. Receiving component 320 may further receive a selection of video clip 202 from the plurality of video clips.

At block 404, the method 400 includes generating a genesis block of a blockchain. For example, in an aspect, computer device 300, processor 305, memory 310, video authentication component 315, and/or generating component 325 may be configured to or may comprise means for generating a genesis block (e.g., record 112) of blockchain 110 or blockchain 200, wherein the genesis block includes video clip 202, metadata of video clip 202 (e.g., name, size, extension, etc., as shown in payload segment 204 in FIG. 2), and a first hash value (e.g., hash value 208) of both video clip 202 and the metadata in payload segment 204).

In some aspects, the generation of the genesis block is specifically in response to receiving a selection of video clip 202 from the plurality of video clips. For example, the selection may be an access request by a user (e.g., law enforcement officer, camera 116 owner, judge, etc.). In some aspects, there may be multiple selections of video clips and each video clip is stored on a different blockchain. In this case, blockchain 200 is a part of a plurality of blockchains and each respective blockchain holds records of different video clips. In some aspects, there may be multiple selections of video clips and each video clip is stored on blockchain 200.

At block 406, the method 400 includes distributing the blockchain to a plurality of nodes in a blockchain network. For example, in an aspect, computer device 300, processor 305, memory 310, video authentication component 315, and/or distributing component 330 may be configured to or may comprise means for distributing blockchain 200 to a plurality of nodes 108 in blockchain network 106. In some aspects, At block 408, the method 400 includes for each indication received of activity performed on the video clip to be recorded on the blockchain, verifying the activity and generating a new block on the blockchain recording the activity. For example, in an aspect, computer device 300, processor 305, memory 310, video authentication component 315, and/or verifying component 335 and generating component 325 may be configured to or may comprise means for, for each indication received of activity performed on video clip 202 to be recorded on blockchain 200, verifying the activity and generating a new block on blockchain 200 recording the activity.

In some aspects, recordable activities include, but are not limited to, accessing video clip 202 (e.g., see payload segment 210), sharing video clip 202 (e.g., see payload segment 212), downloading video clip 202, or modifying video clip (e.g., see payload segment 214). Block 408 represents a continuous amount of time where multiple activities may be performed, verified, and recorded. Once blockchain 200 for video clip 202 is generated, any authorized activity associated with the access of video clip 202 will be recorded on blockchain 200. For example, the activities depicted in FIG. 2 may be examples of activities recorded on blockchain 200. It should be noted that all subsequent blocks in method 400 may occur concurrently with block 408 as new activity may recorded on blockchain 200 at any time.

At block 410, the method 400 includes receiving a modified version of the video clip. For example, in an aspect, computer device 300, processor 305, memory 310, video authentication component 315, and/or receiving component 340 may be configured to or may comprise means for receiving a modified version of video clip 202. When video clip 202 is downloaded from blockchain 200, it is extremely difficult to track modifications made to the video clip. Accordingly, a modified version of video clip 202 can be generated by a malicious entity (e.g., a criminal) to tamper with video evidence. For example, a criminal may use a face swap neural network to change faces of individuals in the video clip. When such a video is presented (e.g., in a court case), the modified version can be compared against the records in blockchain 200.

At block 412, the method 400 includes verifying an authenticity of the modified version based on each activity recorded in the blockchain. For example, in an aspect, computer device 300, processor 305, memory 310, video authentication component 315, and/or verifying component 345 may be configured to or may comprise means for verifying an authenticity of the modified version based on each activity recorded in blockchain 200. This is further described in FIG. 5.

At block 414, the method 400 includes determining whether the modified version is authentic. For example, in an aspect, computer device 300, processor 305, memory 310, video authentication component 315, and/or verifying component 345 may be configured to or may comprise means for determining whether the modified version is authentic. If the modified version is authentic, method 400 advances to block 418. If the modified version is determined to be inauthentic, method 400 advances to block 416.

At block 416, the method 400 includes generating an alert indicating inauthenticity. For example, in an aspect, computer device 300, processor 305, memory 310, video authentication component 315, and/or generating component 350 may be configured to or may comprise means for generating an alert (e.g., a textual or visual output) indicating inauthenticity. For example, the alert may state "the input video is inauthentic." In some aspects, generating component 350 may generate the alert on a user interface on computing device 300. In other aspects, generating component 350 may generate the alert as a text message, a web page, an email, etc.

At block 418, the method 400 includes generating an alert indicating authenticity. For example, in an aspect, computer device 300, processor 305, memory 310, video authentication component 315, and/or generating component 350 may be configured to or may comprise means for generating an alert indicating authenticity.

Figure 5:
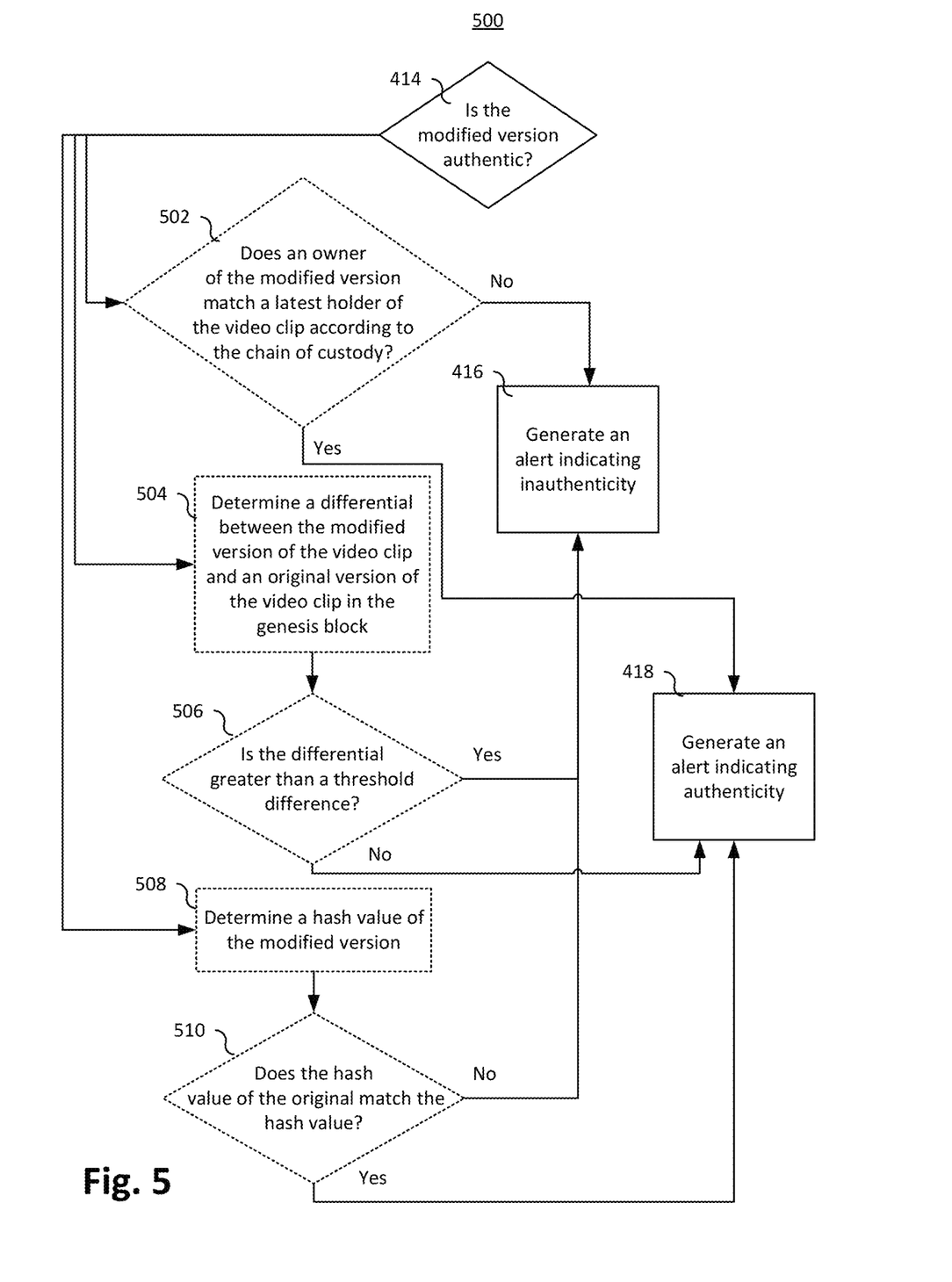
FIG. 5 is a flowchart illustrating a method of determining whether a modified version of a video clip is authentic, in accordance with exemplary aspects of the present disclosure.

FIG. 5 is a flowchart illustrating method 500 of determining whether a modified version of a video clip is authentic, in accordance with exemplary aspects of the present disclosure. Method 500 expands on block 414. It should be noted that method 500 may start at one of block 502, block 504, or block 508. The specific block may be selected by a user of computing device 300.

For example, the records in blockchain 200 may establish a chain of custody of video clip 202. Thus, at block 502, the method 500 includes determining whether an owner of the modified version matches a latest holder of the video clip according to the chain of custody. For example, in an aspect, computer device 300, processor 305, memory 310, video authentication component 315, and/or chain of custody component 351 may be configured to or may comprise means for determining whether an owner of the modified version matches a latest holder of video clip 202 according to the chain of custody. Referring to FIG. 2, the chain of custody indicates that person ABC is the latest person to have (e.g., accessed, downloaded, shared, etc.) video clip 216. Chain of custody component 351 may determine, from the metadata of the modified version in question, an identifier of the owner of the modified version. If the identifier is "Person ABC," method 500 may advance to block 418. Otherwise, method 500 may advance to block 416. In some aspects, if a modified version of the clip is to be authenticated, chain of custody component 351 may retrieve identifiers of all individuals that modified the video clip according to blockchain 200 (e.g., Person DEF) and determine whether the identifier of the creator of the modified version matches the retrieved identifiers.

At block 504, the method 500 includes determining a differential between the modified version of the video clip and an original version of the video clip in the genesis block. For example, in an aspect, computer device 300, processor 305, memory 310, video authentication component 315, and/or differential component 352 may be configured to or may comprise means for determining a differential between the modified version of the video clip and an original version of video clip 202 in the genesis block.

In some aspects, the differential may be a difference in an amount of pixels between the modified video clip and the original clip. For example, differential component 352 may compare each frame of the original video clip with each frame in the modified video clip to determine an amount of pixels from the total count of pixels that changed (e.g., 13% of the pixels changed in the modified version).

In some aspects, the differential may be an amount of frames that do not match between the modified video clip and the original video clip (e.g., 15% of the frames do not match or have been omitted).

At block 506, the method 500 includes determining whether the differential is greater than a threshold difference. For example, in an aspect, computer device 300, processor 305, memory 310, video authentication component 315, and/or differential component 352 may be configured to or may comprise means for determining whether the differential is greater than a threshold difference. For example, differential component 352 may set a predetermined threshold difference (e.g., 10%). If the differential (e.g., 13%) exceeds the threshold difference, method 500 advances to block 416. If the differential (e.g., 5%) does not exceed the threshold difference, method 500 advances to 418.

At block 508, the method 500 includes determining a hash value of the modified version. For example, in an aspect, computer device 300, processor 305, memory 310, video authentication component 315, and/or hashing component 353 may be configured to or may comprise means for determining a hash value of the modified version of the video clip using hashing functions such as SHA-256 or SHA-512.

At block 510, the method 500 includes determining whether the hash value matches a hash value of the original video clip in the genesis block. For example, in an aspect, computer device 300, processor 305, memory 310, video authentication component 315, and/or hashing component 353 may be configured to or may comprise means for determining whether the hash value matches a hash value of the original video clip 202 in blockchain 200 (e.g., hash value 208). If the hash values match, method 500 advances to block 418. If the hash values do not match, method 500 advances to block 416.

It should be noted that blocks 502, 504, and 508 may all be performed as a part of block 414. Verifying component 345 may then use a voting method to make a final determination on authenticity. For example, if the modified version has the same hash value as the original and has no differential (e.g., 0%), but the chain of custody does not match the current owner of the modified version, the modified version may still be considered authentic because two of three determinations indicate authenticity.

Figure 6:
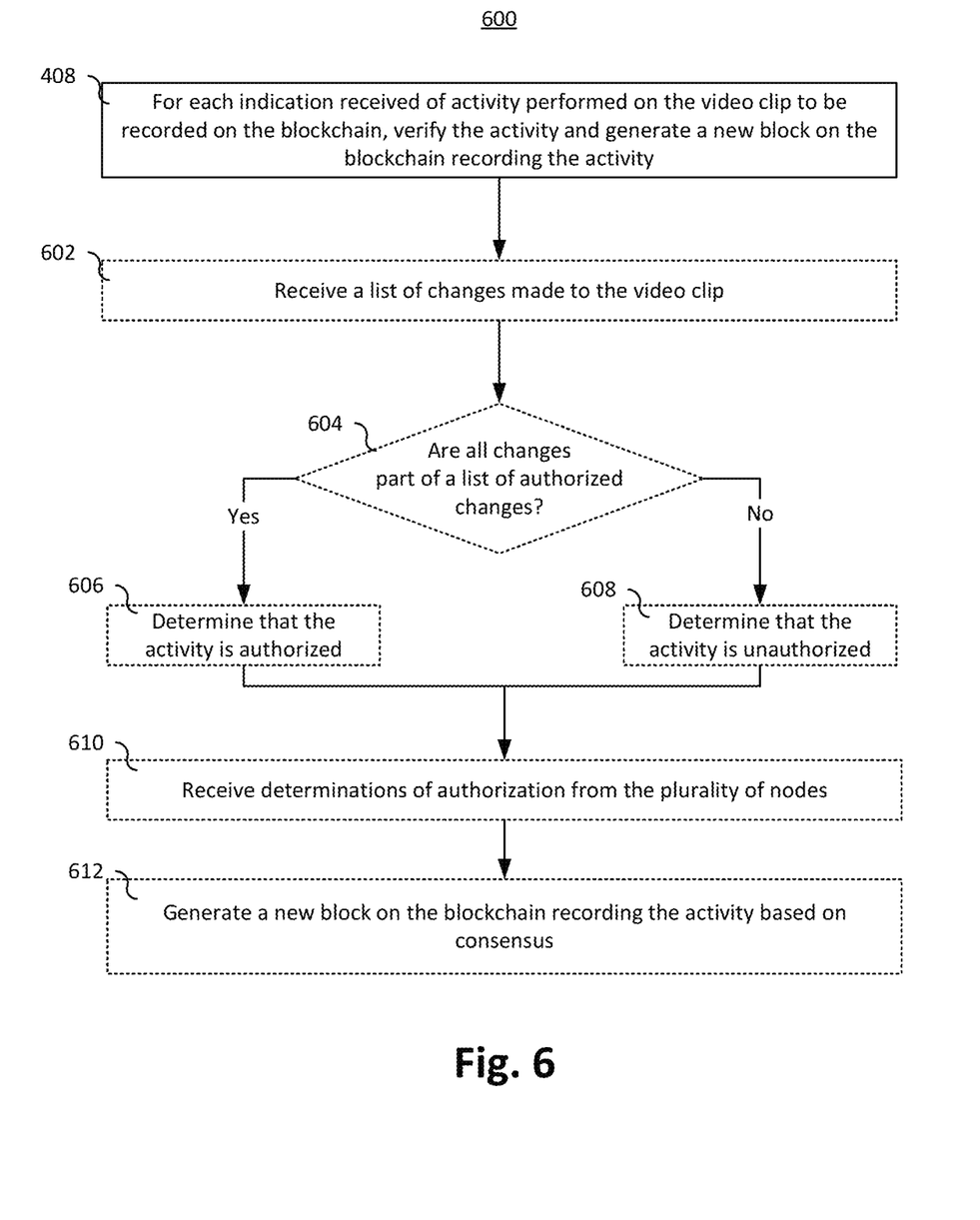
FIG. 6 is a flowchart illustrating a method of recording activity on the blockchain, in accordance with exemplary aspects of the present disclosure.

FIG. 6 is a flowchart illustrating method 600 of recording activity on the blockchain, in accordance with exemplary aspects of the present disclosure. Method 600 is a part of block 408—specifically when the activity involves modifying the video clip.

At block 602, the method 600 includes receiving a list of changes made to the video clip. For example, in an aspect, computer device 300, processor 305, memory 310, video authentication component 315, and/or changes component 354 may be configured to or may comprise means for receiving a list of changes made to video clip 202. Referring to FIG. 2, suppose that Person DEF has generated video clip 216 that zooms into a portion of video clip 202. When submitting video clip 216 as an authorized activity on blockchain 200, person DEF may include a project file that indicates all of the changes made to video clip 202, their associated timestamps, rendering application identifier (e.g., iMovie, Adobe Premiere), etc. These changes may include cropping, clipping, voice enhancement, etc.

At block 604, the method 600 includes determining whether the changes are a part of a list of authorized changes. For example, in an aspect, computer device 300, processor 305, memory 310, video authentication component 315, and/or changes component 354 may be configured to or may comprise means for determining whether the changes are a part of a list of authorized changes. The list of authorized changes may be stored in memory 310. The authorized changes may include actions that can be included in a project file (e.g., clipping, cropping, etc.) and limits to each action. For example, an authorized change may be clipping a video clip up to 50% of the original length. Further clipping may be unauthorized. Likewise, changes such as overlaying music, muting sound, changing faces, etc., may be unauthorized. Accordingly, if a change in the project file includes an unauthorized change, the modified clip should not be included on blockchain 200. In some aspects, changes component 354 executes a smart contract that assesses whether all changes in the project file are present in the list of authorized changes. If all changes are present in the list of authorized changes, method 600 advances to block 606. Otherwise, method 600 advances to block 608.

At block 606, the method 600 includes determining that the activity (e.g., the modification) is authorized. For example, in an aspect, computer device 300, processor 305, memory 310, video authentication component 315, and/or changes component 354 may be configured to or may comprise means for determining that the activity is authorized.

At block 608, the method 600 includes determining that the activity is unauthorized. For example, in an aspect, computer device 300, processor 305, memory 310, video authentication component 315, and/or changes component 354 may be configured to or may comprise means for determining that the activity is unauthorized.

At block 610, the method 600 includes receiving determinations of authorization from the plurality of nodes. For example, in an aspect, computer device 300, processor 305, memory 310, video authentication component 315, and/or verifying component 335 may be configured to or may comprise means for receiving determinations of authorization from the plurality of nodes 108.

At block 612, the method 600 includes generating a new block on the blockchain recording the activity based on consensus. For example, in an aspect, computer device 300, processor 305, memory 310, video authentication component 315, and/or generating component 325 may be configured to or may comprise means for generating a new block on the blockchain recording the activity based on consensus. For example, if a majority or all of the plurality of nodes determine that the modification is authorized, video clip 216 will be recorded on blockchain 200. If a majority or all of the plurality of nodes determine that the modification is unauthorized, video clip 216 will not be recorded on blockchain 200.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method for verifying video authenticity using blockchain, comprising:
   receiving a video clip from a first source;
   generating a genesis block of a blockchain, wherein the genesis block includes the video clip, metadata of the video clip, and a first hash value of both the video clip and the metadata;
   distributing the blockchain to a plurality of nodes in a blockchain network;
   for each indication received of activity performed on the video clip to be recorded on the blockchain, verifying the activity and generating a new block on the blockchain recording the activity, wherein the activity comprises modifying the video clip, and wherein verifying the activity comprises:
   determining that a consensus is reached by the plurality of nodes that the activity is authentic, wherein each of the plurality of nodes is configured to:
      determine whether all changes made to the video clip in the activity are part of a list of authorized changes by analyzing a project file that indicates video edits made on the video clip using a rendering application;
      in response to determining that all changes are part of the list of authorized changes, verify the activity; and
      reject the activity in response to determining that at least one change made to the video clip is not part of the list of authorized changes, wherein the at least one change comprises adding additional audio to the video clip, removing all audio from the video clip, or swapping a face detected in the video clip with a different face;
   receiving a modified version of the video clip;
   verifying an authenticity of the modified version based on each activity recorded in the blockchain; and
   in response to determining that the modified version is not authentic, generating an alert indicating inauthenticity.

2. The method of claim 1, further comprising:
   receiving a plurality of video clips including the video clip from the first source;
   receiving a selection of the video clip from the plurality of video clips; and
   wherein generating the genesis block of the blockchain including the video clip, the metadata of the video clip, and the first hash value of both the video clip and the metadata comprises selectively generating the genesis block in response to the selection.

3. The method of claim 1, wherein the activity comprises one of:

accessing the video clip,
sharing the video clip,
downloading the video clip, or
modifying the video clip.

4. The method of claim 1, wherein records in the blockchain establish a chain of custody of the video clip, and wherein determining that the modified version is not authentic comprises:
determining that an owner of the modified version of the video clip does not match a latest holder of the video clip according to the chain of custody.

5. The method of claim 1, wherein determining that the modified version is not authentic comprises:
determining a differential between the modified version of the video clip and an original version of the video clip in the genesis block; and
in response to determining that the differential is greater than a threshold difference, determining that the modified version is not authentic.

6. The method of claim 1, wherein determining that the modified version is not authentic comprises:
determining a second hash value of the modified version of the video clip and metadata associated with the modified version;
in response to determining that the first hash value does not match the second hash value, determining that the modified version is not authentic.

7. The method of claim 1, wherein multiple video clips and activity associated with the multiple video clips are stored on the blockchain.

8. The method of claim 1, wherein the blockchain is a part of a plurality of blockchains, wherein each respective blockchain holds records of different video clips.

9. The method of claim 1, wherein the blockchain network is a private blockchain network.

10. The method of claim 1, wherein the blockchain network is provided by a blockchain-as-a-service.

11. An apparatus for verifying video authenticity using blockchain, comprising:
a memory; and
a processor communicatively coupled with the memory and configured to:
receive a video clip from a first source;
generate a genesis block of a blockchain, wherein the genesis block includes the video clip, metadata of the video clip, and a first hash value of both the video clip and the metadata;
distribute the blockchain to a plurality of nodes in a blockchain network;
for each indication received of activity performed on the video clip to be recorded on the blockchain, verify the activity and generate a new block on the blockchain recording the activity, wherein the activity comprises modifying the video clip, and wherein verifying the activity comprises:
determining that a consensus is reached by the plurality of nodes that the activity is authentic, wherein each of the plurality of nodes is configured to:
determine whether all changes made to the video clip in the activity are part of a list of authorized changes by analyzing a project file that indicates video edits made on the video clip using a rendering application;
in response to determining that all changes are part of the list of authorized changes, verify the activity; and
reject the activity in response to determining that at least one change made to the video clip is not part of the list of authorized changes, wherein the at least one change comprises adding additional audio to the video clip,
removing all audio from the video clip, or swapping a face detected in the video clip with a different face;
receive a modified version of the video clip;
verify an authenticity of the modified version based on each activity recorded in the blockchain; and
in response to determining that the modified version is not authentic, generate an alert indicating inauthenticity.

12. The apparatus of claim 11, wherein the processor is further configured to:
receive a plurality of video clips including the video clip from the first source;
receive a selection of the video clip from the plurality of video clips; and
generate the genesis block of the blockchain including the video clip, the metadata of the video clip, and the first hash value of both the video clip and the metadata by selectively generating the genesis block in response to the selection.

13. The apparatus of claim 11, wherein the activity comprises one of:
accessing the video clip,
sharing the video clip,
downloading the video clip, or
modifying the video clip.

14. The apparatus of claim 11, wherein records in the blockchain establish a chain of custody of the video clip, and wherein the processor is further configured to determine that the modified version is not authentic by:
determining that an owner of the modified version of the video clip does not match a latest holder of the video clip according to the chain of custody.

15. The apparatus of claim 11, wherein the processor is further configured to determine that the modified version is not authentic by:
determining a differential between the modified version of the video clip and an original version of the video clip in the genesis block; and
in response to determining that the differential is greater than a threshold difference, determining that the modified version is not authentic.

16. The apparatus of claim 11, wherein the processor is further configured to determine that the modified version is not authentic by:
determining a second hash value of the modified version of the video clip and metadata associated with the modified version;
in response to determining that the first hash value does not match the second hash value, determining that the modified version is not authentic.

17. The apparatus of claim 11, wherein multiple video clips and activity associated with the multiple video clips are stored on the blockchain.

18. A non-transitory computer-readable medium for verifying video authenticity using blockchain, executable by a processor to:
receive a video clip from a first source;
generate a genesis block of a blockchain, wherein the genesis block includes the video clip, metadata of the video clip, and a first hash value of both the video clip and the metadata;

distribute the blockchain to a plurality of nodes in a blockchain network;
for each indication received of activity performed on the video clip to be recorded on the blockchain, verify the activity and generate a new block on the blockchain recording the activity, wherein the activity comprises modifying the video clip, and wherein verifying the activity comprises:
  determining that a consensus is reached by the plurality of nodes that the activity is authentic, wherein each of the plurality of nodes is configured to:
    determine whether all changes made to the video clip in the activity are part of a list of authorized changes by analyzing a project file that indicates video edits made on the video clip using a rendering application;
    in response to determining that all changes are part of the list of authorized changes, verify the activity; and
    reject the activity in response to determining that at least one change made to the video clip is not part of the list of authorized changes, wherein the at least one change comprises adding additional audio to the video clip, removing all audio from the video clip, or swapping a face detected in the video clip with a different face;
receive a modified version of the video clip;
verify an authenticity of the modified version based on each activity recorded in the blockchain; and
in response to determining that the modified version is not authentic, generate an alert indicating inauthenticity.

* * * * *